(12) United States Patent
Wang (10) Patent No.: US 9,385,489 B2
(45) Date of Patent: Jul. 5, 2016

(54) ADJUSTABLE ELECTRICAL-POWER OUTLET STRIP

(71) Applicant: Calvin Wang, City of Industry, CA (US)

(72) Inventor: Calvin Wang, City of Industry, CA (US)

( * ) Notice: Subject to any disclaimer, the term of this patent is extended or adjusted under 35 U.S.C. 154(b) by 430 days.

(21) Appl. No.: 13/927,336

(22) Filed: Jun. 26, 2013

(65) Prior Publication Data
US 2015/0001937 A1    Jan. 1, 2015

(51) Int. Cl.
| | | |
|---|---|---|
| H02J 7/34 | (2006.01) | |
| H02J 1/10 | (2006.01) | |
| H02J 3/38 | (2006.01) | |
| H01R 13/70 | (2006.01) | |
| H02J 3/00 | (2006.01) | |
| G06F 1/16 | (2006.01) | |
| H01R 31/06 | (2006.01) | |
| H02J 3/14 | (2006.01) | |
| H01R 24/78 | (2011.01) | |
| H01R 35/00 | (2006.01) | |

(52) U.S. Cl.
CPC *H01R 13/70* (2013.01); *G06F 1/16* (2013.01); *H01R 31/065* (2013.01); *H02J 3/00* (2013.01); *H01R 24/78* (2013.01); *H01R 35/00* (2013.01); *H02J 3/14* (2013.01); *Y10T 307/549* (2015.04)

(58) Field of Classification Search
CPC .......... F21V 21/00; H01R 13/73; H02H 3/16; H02M 7/02; H02J 1/00; H02G 3/02
USPC .............. 307/51, 66, 64, 80, 86, 82, 83, 81; 361/42, 622; 362/147, 227, 235, 20; 439/488, 620.21
See application file for complete search history.

(56) References Cited

U.S. PATENT DOCUMENTS

| | | | |
|---|---|---|---|
| 7,001,192 B1 | 2/2006 | Weh | |
| 7,473,141 B2 | 1/2009 | Liao | |
| 7,771,239 B1 | 8/2010 | Hsiao | |
| 7,815,332 B1 * | 10/2010 | Smith | F21S 8/04 362/133 |
| 2005/0191902 A1 * | 9/2005 | Kim | H01R 13/70 439/552 |
| 2013/0015714 A1 * | 1/2013 | Kwok | H02J 1/10 307/75 |
| 2014/0098445 A1 * | 4/2014 | Hooper | H02H 3/16 361/42 |
| 2014/0183977 A1 * | 7/2014 | Braunstein | H02G 3/00 307/147 |

* cited by examiner

*Primary Examiner* — Rexford Barnie
*Assistant Examiner* — Jagdeep Dhillon
(74) *Attorney, Agent, or Firm* — Albert O. Cota (57) ABSTRACT

An adjustable electrical-power outlet strip (AEOS) that allows a selected quantity of electrical receptacles to be connected on a single power strip. In addition to the electrical receptacles there is also a USB port that can be connected via a USB cable to charge an electronic component such as a cell phone. The AEOS is also designed to allow each of the connected power receptacles to be rotated to an optimum usable angle.

4 Claims, 6 Drawing Sheets

ADJUSTABLE ELECTRICAL-POWER OUTLET STRIP

TECHNICAL FIELD

The invention generally pertains to electrical power outlet strips, and more particularly to a power outlet strip having a plurality of individual a-c power modules that can be selectively rotated to an optimum usable position.

BACKGROUND ART

AC electrical power strips are configured to increase the capacity and accessibility of a single electrical power receptacle. Most prior art power outlet strips include an elongated housing having an upper surface that include a power switch, a plurality of electrical power receptacles, and an end section from where extends a power cord that is connected to a single power receptacle attached to an a-c voltage source. When the power switch is turned on, power is simultaneously available at each of the power receptacles.

A typical a-c power strip has all the a-c power receptacles located in a single straight line along the upper surface of the strip. This is sufficient if all of the a-c plugs are standard. However, in many instances a power supply for a printer or scanner must be plugged in. These are often self-contained power supply units. Plugging in this type of power supply will cover one or more of the other a-c receptacles rendering them unacceptable. There is the option of plugging in such a device on the last receptacle of the power strip and letting it hang off the end of the strip. However, if more than one of these plugs must be plugged in, you will lose the use of an a-c receptacle on the power strip that is now covered. In some instances it will cover "two" of the a-c receptacles rendering most of the power strip useless.

The adjustable electrical-power outlet strip enhances the utility of the prior art power strips. The enhancement consists of having an optimum number of individual and detachable power receptacles that can be rotated to an optimum useable position.

A search of the prior art did not disclose any literature or patents that read directly on the claims of the instant invention. However, the following U.S. patents are considered related:

| PATENT NO. | INVENTOR | ISSUED |
|---|---|---|
| 7,771,239 | Hsiao | 10 Aug. 2010 |
| 7,473,141 | Liao | 6 Jan. 2009 |
| 7,001,192 | Yeh | 21 Feb. 2006 |

The U.S. Pat. No. 7,771,239 discloses a power receptacle having a stationary base and at least one rotating base. The rotating base is rotatably mounted on the stationary base and has at least one socket. The socket is covered when the rotating base is rotated to a position that prevents users from touching the socket and getting an electric shock.

The U.S. Pat. No. 7,473,141 discloses a transfer plug for a variety of sockets and includes an insulating shell, first and second connectors and a signal plug. The first and second connectors combine with an insulating shell respectively and are electrically connected. The signal plug movably connects to the insulating shell and has a third connector that attaches to the second connector. The signal plug can sidably move and turn in different directions when not in use.

The U.S. Pat. No. 7,001,192 discloses a connector having a terminal base with a plurality of connection terminals mounted thereon, and a main frame having slide tracks. The main frame is mounted on the rear end of the terminal base which is mounted upside down on the main frame to position the terminal base within the slide tracks of the main frame.

DISCLOSURE OF THE INVENTION

The adjustable electrical-power outlet strip (AEOS) is designed to be easily configured with a selectable quantity of a-c power receptacles and to rotatably position the power receptacles in an optimum angular position. In its basic design configuration the AEOS is comprised of:

A. An a-c electrical power cord having an outer end and an inner end. The outer end is attached to an electrical plug that is inserted into a receptacle connected to an a-c power source, B. A power input and control module having an ON-OFF power switch, an a-c power receptacle, and a female output connector. When the power switch is placed in an ON position the a-c electrical power is available at the a-c power receptacle and at the female output connector, C. A first a-c power module having an a-c power receptacle, a female output connector and a male input pug that is dimensioned to interface with the female output connector. When the power switch is placed in the ON position power is available at the female power receptacle, and D. A second a-c power module having an a-c power receptacle, a male input plug and a female output connector. The male input connector is designed to interface with the female output connector located in the second a-c power module, wherein the female output connector is covered by a safety cap that is attached by an attachment means.

The first a-c power module can be interchanged with the second a-c power module or the second a-c power module can be interchanged with the first a-c power module. Also, the phone jack functions in combination with a first section of a first twist and lock connector and a female phone jack functions in combination with a second section of a second twist and lock connector. The twist and lock connectors allow the interfacing a-c power modules to be selective-rotated clockwise or counter-clockwise by 360-degrees.

In view of the above disclosure, the primary object of the invention is to produce an adjustable electrical-power (AEOS) that is designed to accommodate a plurality of electrical output receptacles that can be individually rotated to an optimum usable position. The AEOS also includes a USB port that is used, via a USB cable, to charge the battery of various electronic devices.

In addition to the primary object of the invention it is also an object of the invention to provide an AEOS that:

can be custom designed to meet the specific requirements of an end user, has a long useful line, is easy to lock and unlock the individual a-c power modules, can be produced in various color schemes, and is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms that disclose a preferred embodiment of an adjustable electrical-power outlet strip (AEOS). The AEOS allows a user to select any number of a-c power modules and to rotate and lock the modules to an optimum angular orientation. The preferred embodiment of the AEOS 10, as shown in FIGS. 1-11, is comprised of the following major elements: an a-c electrical power cord 12, a power input and control module 30, an a-c power module 80, a USB power supply 68 and a USB connector 72.

Figure 1:
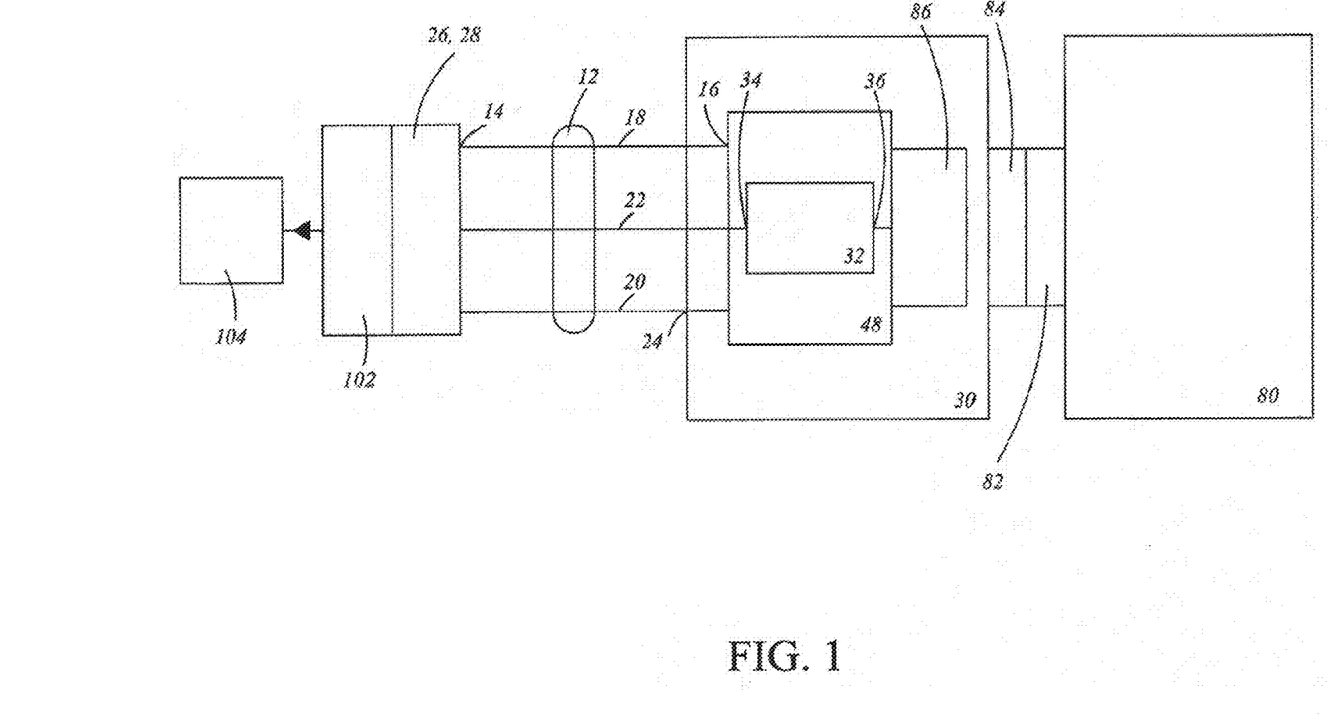
FIG. 1 is a block diagram of an adjustable electrical-power outlet strip (AEOS).

The a-c electrical power cord 12, as shown in FIG. 1, is comprised of an outer end 14, an inner end 24, a hot lead 18, a neutral end 20 and a ground lead 22. The outer end 14 of the cord 12 has attached an electrical plug 26 such as a three-prong plug 28. The plug 28 is inserted into an electrical receptacle 102 that is connected to a utility power source such as a 120-volt a-c power source 104, as also shown in FIG. 1.

Figure 2:
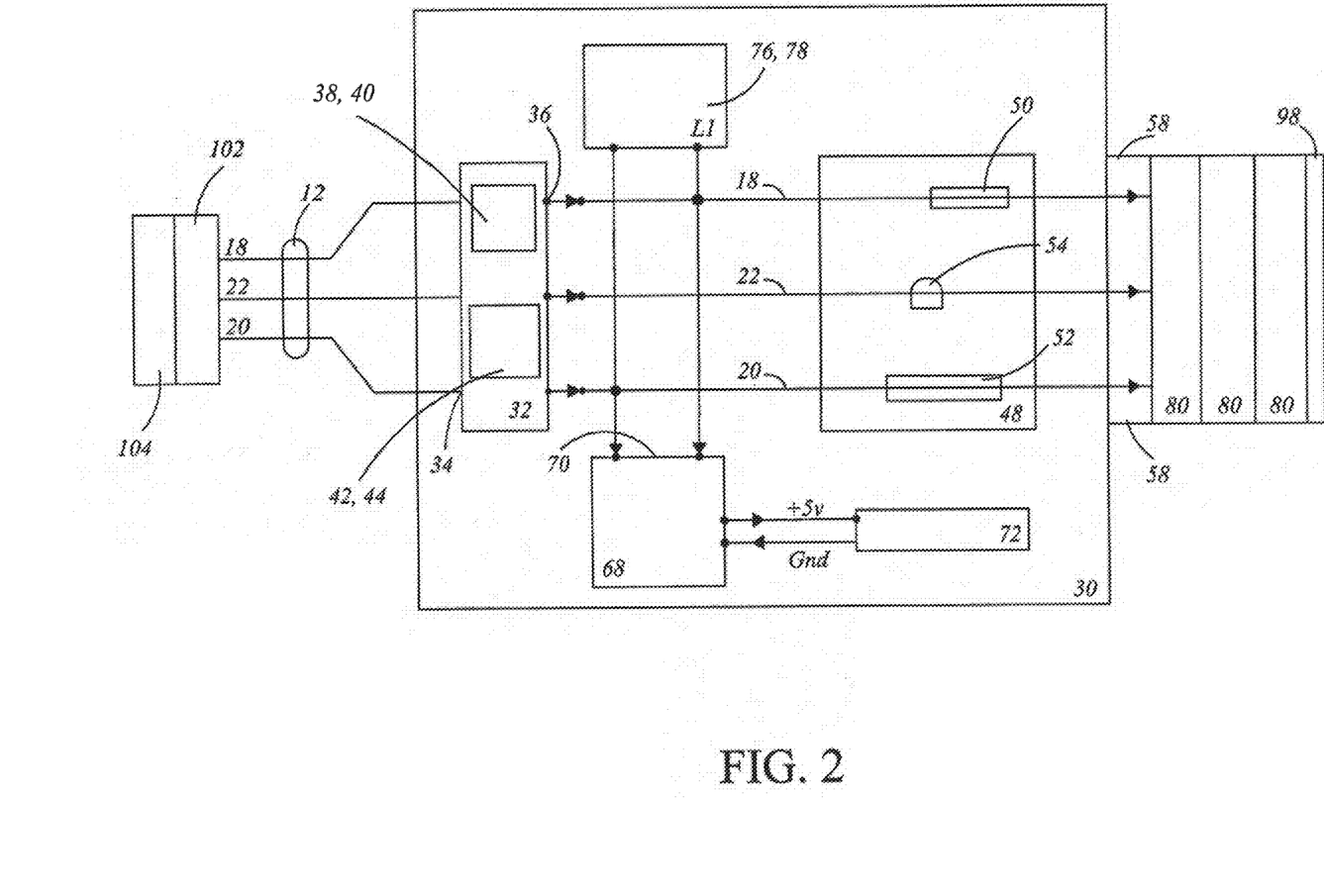
FIG. 2 is a block diagram of the power input and control module.
Figure 3:
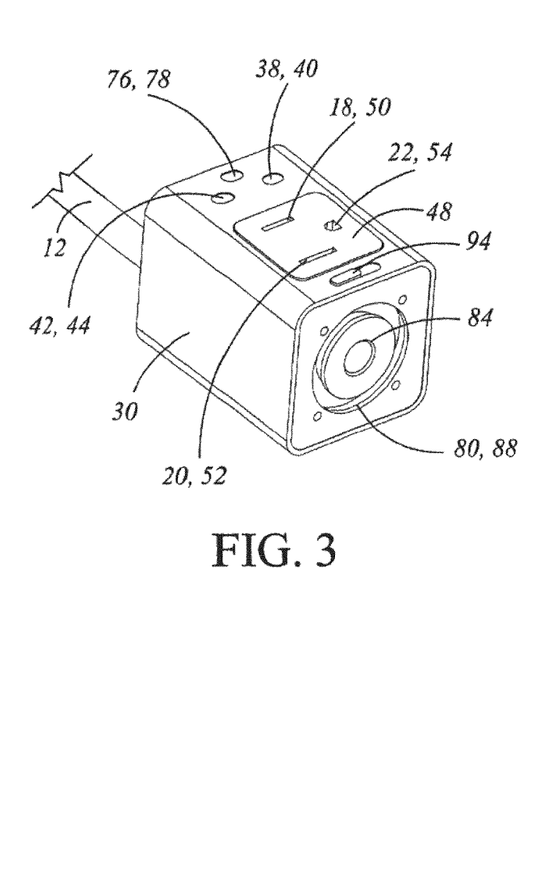
FIG. 3 is an orthographic rear view of a power input and control module.
Figure 4:
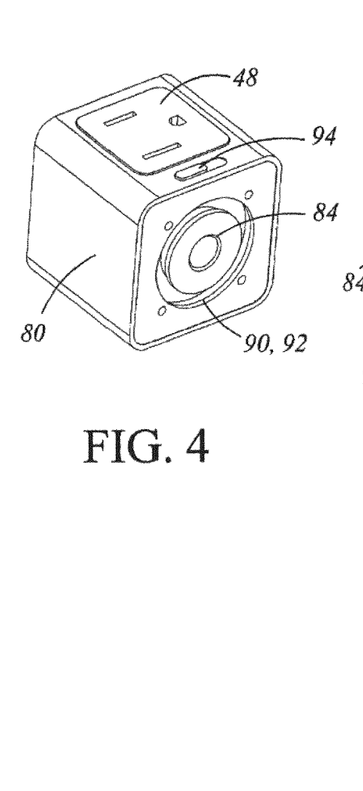
FIG. 4 is an orthographic rear view of an a-c power module.

The power input and control module 30, as shown in FIGS. 1, 2 and 3, comprises a ground-fault interrupt circuit (GFIC) 32 having an input 34 and an output 36. The input 34 is connected to the inner end 16 of the a-c electrical power cord 12. The GFIC 32, as shown in FIGS. 1 and 2, includes a TEST button 38 that also functions as power OFF switch 40, and a RESET button 42 that also functions as a power ON switch 44. The module 30, also includes an a-c power output socket 48, a female power output connector 84, a USB power supply 68, a USB power output connector 72 and a power ON indicator lamp 76 that preferably consists of an LED 78. The a-c power output socket 48 has a first receptacle 50 connected to the hot lead 18, a second receptacle 52 connected to the neutral lead 20 and a ground receptacle 54 connected to the ground lead 22. Likewise, the female power output connector 84 is attached to the three leads 18, 20, 22 applied from the a-c power output socket 48.

Figure 6:
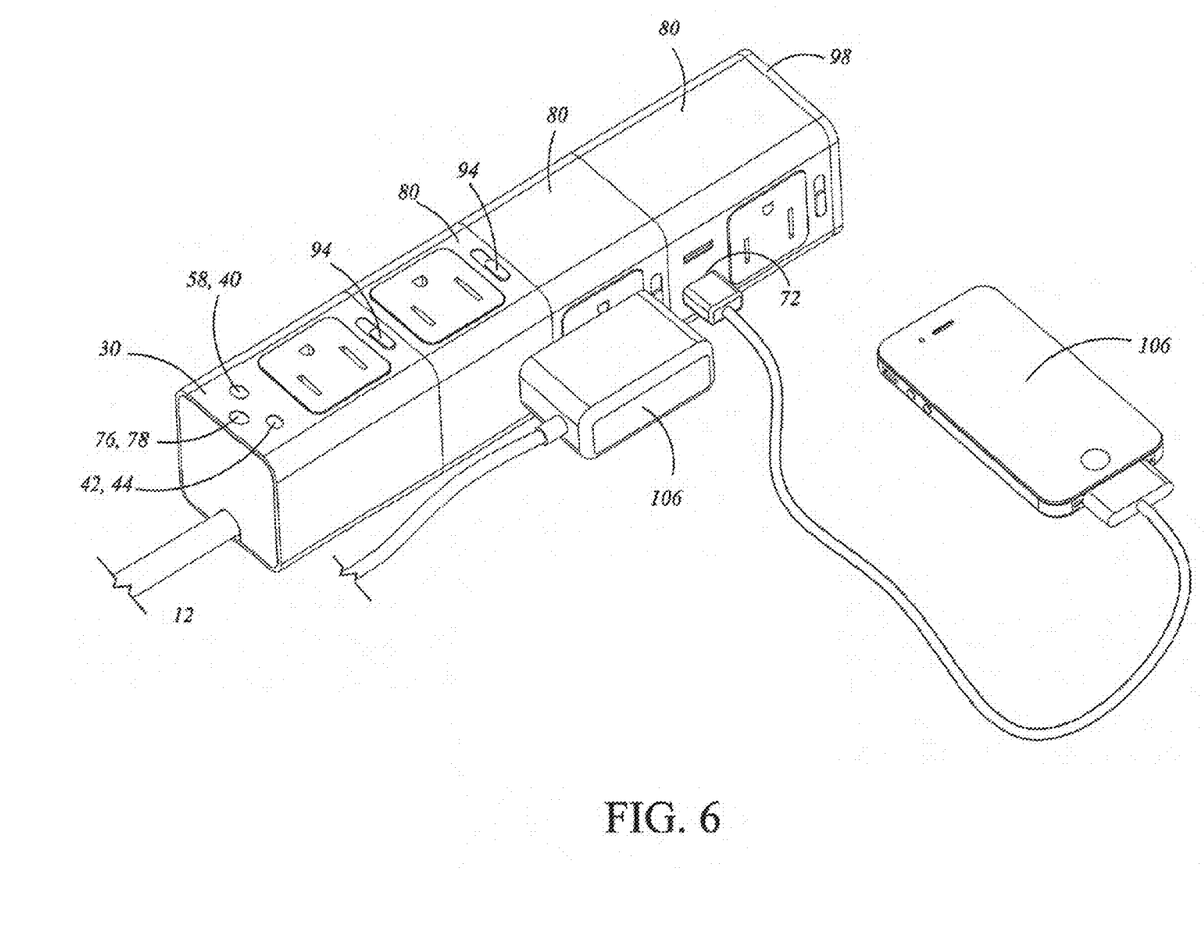
FIG. 6 is an orthographic top and side view of an AEOS showing two of the a-c power module rotated 90-degrees and having a power supply unit and an electronic device attached to the rotated a-c power modules.

The USB power supply 68, as shown in FIG. 2, has an input 70 connected to the hot lead 18 and to the neutral lead 20 that are applied from the output 36 of the GFIC 32, as best shown in FIG. 2. The USB power supply 68 produces a d-c output voltage ranging from 4 to 6 volts d-c. The USB connector 72, which is dimensioned to accommodate a particular electronic device 106, is applied the d-c voltage, as shown in FIG. 6, from the USB power supply 68. The module 30 also includes a power ON indicator lamp 76 that is connected across the hot lead 18 and the neutral lead 20 that are both applied from the output 36 of the GFIC 32.

Figure 7:
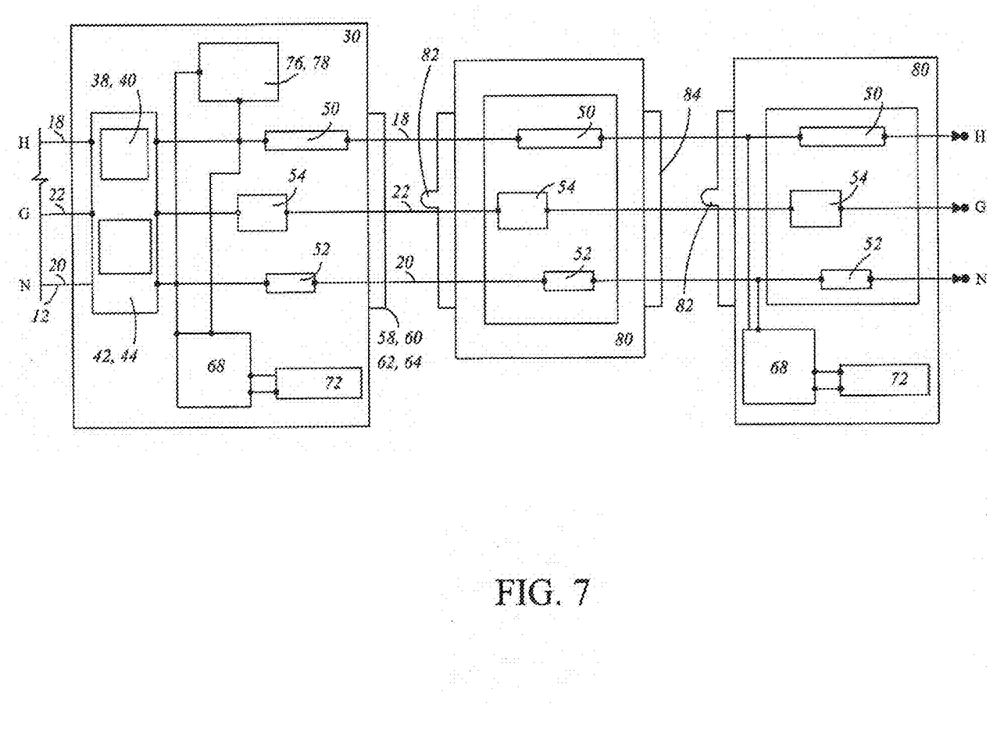
FIG. 7 is a block diagram showing the relative positions of a power input and control module prior to being connected to a first a-c power module shown prior to being connected to a second a-c power module.

The AEOS 10 functions, as shown in FIGS. 2, 6 and 7, in combination with at least one a-c power module 80 that is connected in series with the output of the power input and control module 30. Each of the a-c power modules 80 comprises a male three-connector plug 82 that is dimensioned to interface with the female three-conductor jack 84 located on the power input and control module 30.

Figure 5:
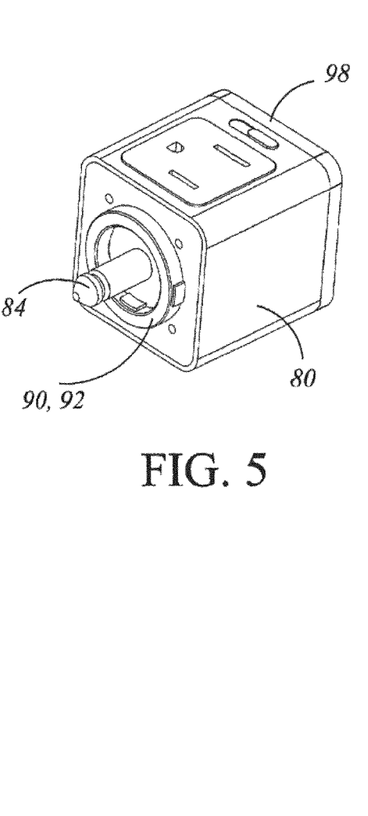
FIG. 5 is an orthographic front view of an a-c power module having attached a safety cap.

The female three-conductor jack 84 is further designed to function in combination with a first section. 86 of a first twist and lock concentric connector 88. Likewise, the male three-conductor plug 82 is dimensioned to function in combination with a second section 90 of a second twist and lock concentric connector 92. The twist and lock connector 92 allows two interfacing a-c power modules 80 to be selectively-rotated clockwise 360-degrees or counter-clockwise 360-degrees. The modules 30 and/or 80 can be designed to include a lock release button 94 that allows the modules to be locked in-place at the selected angular displacement To prevent an inadvertent electrical shock, a safety cap 98, as shown in FIGS. 2 and 5, is provided that is dimensioned to be releasably attached to the female output connector 58 that is attached to the last female three-conductor jack attached to the AEOS 10.

As shown in FIGS. 8, 9, 10 and 11, the USB connector 72 is powered by a USB power supply 68 that can be configured in four design configurations.

Figure 8:
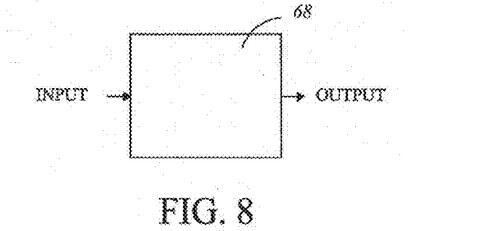
FIG. 8 is a block diagram of a first design USB power supply comprised of an integrated circuit.

The first USB power supply 68, as shown in FIG. 8, is comprised of an a-c to d-c converter integrated circuit having an input that is connected across the hot lead 18 and the neutral lead 20, and an output that ranges from 4 to 6 volts d-c.

Figure 9:
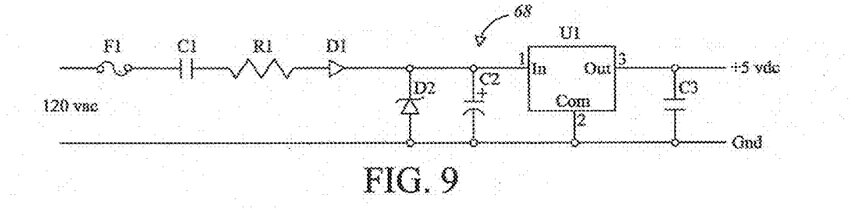
FIG. 9 is a schematic diagram of a second USB power supply design comprised of discrete components.

The second USB power supply 68, as shown in FIG. 9, is applied 120-volts a-c through a fuse (F1), an isolation capacitor (C1), a voltage limiting resistor (R1) and a diode (D1) to the input (In) of a voltage regulator (U1). Attached across the input to ground is a voltage clamping zener diode (D2) and a filter capacitor (C2). The voltage regulator (U1) produces a regulated d-c voltage ranging from 4 to 6 volts d-c that is taken at pin (Out) of regulator (111) across a filter capacitor (C3).

Figure 10:
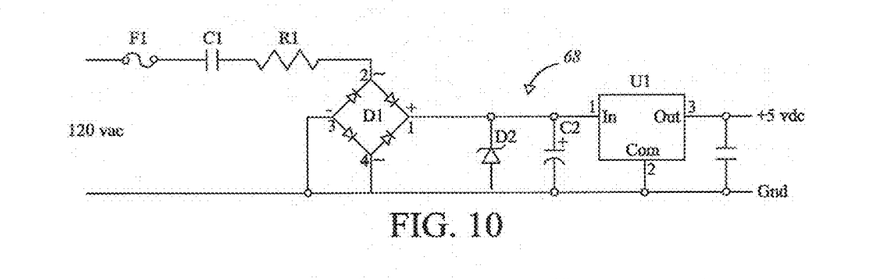
FIG. 10 is a schematic diagram of a third design of a USB power supply.

The third USB power supply 68, as shown in FIG. 10, is applied 120-volts a-c through a fuse (F1), an isolation capacitor (C1), and a voltage limiting resistor (R1) to the input of a voltage rectifier (VR1). The output of the voltage rectifier (VR1) is applied to the input (In) of a voltage regulator (U1), across a zener diode (D1) and a filter capacitor (C2). The voltage regulator (U1) produces a regulated d-c voltage ranging from 4 to 6 volts that is taken from the (Out) of (U1) across a filter capacitor (C3).

Figure 11:
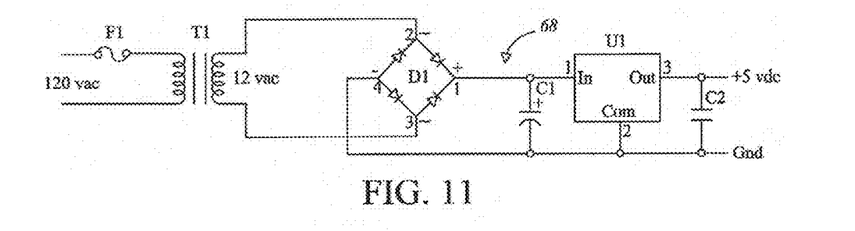
FIG. 11 is a schematic diagram of a fourth design of a USB power supply.

The fourth USB power Supply 68, as shown in FIG. 11, is applied 120-volts a-c through a fuse (F1) to the primary winding of a step-down transformer (T1) having a secondary winding that is attached across a full-wave rectifier (VR1). The output of the rectifier (VR1) is attached across a filter capacitor (C1) to the output (In) of a voltage regulator (U1). The output (Out) if the voltage regular (U1), which is taken across a filter capacitor (C2) produces a regulated d-c voltage ranging from 4 to 6 volts.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. An adjustable electrical-power outlet strip (AEOS) that functions in combination with a 120-volt a-c power source, said AEOS comprising:
   a) an a-c electrical power cord having an outer end, an inner end, a hot lead, a neutral lead and a ground lead, wherein the outer end is attached to a three-prong plug that is inserted into an electrical receptacle connected to the 120-volt a-c power source,
   b) a power input and control module comprising:
      (1) a ground-fault interrupt circuit (GFIC) having an input and an output, wherein the input is connected to the inner end of said a-c electrical power cord,
      wherein said GFIC includes a TEST button that also functions as a power OFF switch, and a RESET button, that also functions as a power ON switch,
      (2) an a-c power outlet socket having a first receptacle connected to the hot lead, a second receptacle connected to the neutral lead and a ground receptacle connected to the ground lead,
      (3) a USB power supply having an input connected to the hot lead and the neutral lead that are applied from the output of said GFIC, wherein said USB power supply produces a d-c output voltage ranging from 4 to 6 volts d-c,
      (4) a USB connector that is applied the d-c voltage from said USB power supply,
      (5) a LED power ON indicator lamp connected across the hot lead and the neutral lead that are applied from said GFIC, and
   c) at least one additional a-c power module having means for being rotatably attached in series with said power input and control module, and
   d) a female three-conductor jack that functions in combination with a first section of a first twist and lock concentric connector, wherein said male three-conductor plug functions in combination with a second section of a second twist and lock concentric connector that interfaces with the first section of said first twist and lock concentric connector.

2. An adjustable electrical-power outlet strip (AEOS) that functions in combination with a 120-volt a-c power source, said AEOS comprising:
   (a) an a-c electrical power cord having an outer end, an inner end, a hot lead, a neutral lead and a ground lead, wherein the outer end is attached to a three-prong plug that is inserted into an electrical receptacle connected to the 120-volt a-c power source,
   (b) a power input and control module comprising:
      (1) a ground fault (GFIC) having an input and an output, wherein the input is connected to the inner end of said a-c electrical power cord, wherein said GFIC includes a TEST button that also functions as a power OFF switch, and a RESET button, that also functions as a power ON switch,
      (2) an a-c power outlet socket having a first receptacle connected to the hot lead, a second receptacle connected to the neutral lead and a ground receptacle connected to the ground lead,
      (3) a USB power supply having an input connected to the hot lead and the neutral lead that are applied from the output of said GFIC, wherein said USB power supply produces a d-c output voltage ranging from 4 to 6 volts d-c,
      (4) a USB connector that is applied the d-c voltage from said USB power supply,
      (5) a LED power ON indicator lamp connected across the hot lead and the neutral lead that are applied from said GFIC, and
   (c) at least one additional a-c power module having means for being rotatably attached in series with said power input and control module,
   wherein said USB power supply is further comprised of a second USB power supply circuit that is applied 120 volts a-c through a fuse (F1), an isolation capacitor (C1), a voltage limiting resistor (R1), and a diode (D1) to input (In) of voltage regulator (U1), wherein attached across the input to ground is a voltage clamping Zener diode (D1) and a filter capacitor (C2), wherein the voltage regulator (U1) produces a regulated d-c voltage ranging from 4 to 6 volts d-c that is taken at pin (out) of (U1) across a filter capacitor (C3).

3. An adjustable electrical-power outlet strip (AEOS) that functions in combination with a 120-volt a-c power source, said AEOS comprising:
   (a) an a-c electrical power cord having an outer end, an inner end, a hot lead, a neutral lead and a ground lead, wherein the outer end is attached to a three-prong plug that is inserted into an electrical receptacle connected to the 120-volt a-c power source,
   (b) a power input and control module comprising:
      (1) a ground fault (GFIC) having an input and an output, wherein the input is connected to the inner end of said a-c electrical power cord, wherein said GFIC includes a TEST button that also functions as a power OFF switch, and a RESET button, that also functions as a power ON switch,
      (2) an a-c power outlet socket having a first receptacle connected to the hot lead, a second receptacle connected to the neutral lead and a ground receptacle connected to the ground lead,
      (3) a USB power supply having an input connected to the hot lead and the neutral lead that are applied from the output of said GFIC, wherein said USB power supply produces a d-c output voltage ranging from 4 to 6 volts d-c,
      (4) a USB connector that is applied the d-c voltage from said USB power supply,
      (5) a LED power ON indicator lamp connected across the hot lead and the neutral lead that are applied from said GFIC, and
   (c) at least one additional a-c power module having means for being rotatably attached in series with said power input and control module, wherein said USB power supply is further comprised of a third USB power supply circuit that is applied 120 volts a-c through a fuse (F1), an isolation capacitor (C1), a voltage limiting resistor (R1) to the input of a full-wave voltage rectifier (VR1), wherein the output of the voltage regulator is applied to the input (In) of a voltage regulator (U1) across a Zener diode (D1) and a filter capacitor (C2), wherein the voltage regulator (U1) produces a regulated d-c voltage ranging from 4 to 6 volts d-c that is taken at pin (out) of (U1) across a filter capacitor (C3).

4. An adjustable electrical-power outlet strip (AEOS) that functions in combination with a 120-volt a-c power source, said AEOS comprising:
   (a) an a-c electrical power cord having an outer end, an inner end, a hot lead, a neutral lead and a ground lead, wherein the outer end is attached to a three-prong plug that is inserted into an electrical receptacle connected to the 120-volt a-c power source, (b) a power input and control module comprising:

(1) a ground fault (GFIC) having an input and an output, wherein the input is connected to the inner end of said a-c electrical power cord, wherein said GFIC includes a TEST button that also functions as a power OFF switch, and a RESET button, that also functions as a power ON switch, (2) an a-c power outlet socket having a first receptacle connected to the hot lead, a second receptacle connected to the neutral lead and a ground receptacle connected to the ground lead, (3) a USB power supply having an input connected to the hot lead and the neutral lead that are applied from the output of said GFIC, wherein said USB power supply produces a d-c output voltage ranging from 4 to 6 volts d-c, (4) a USB connector that is applied the d-c voltage from said USB power supply, (5) a LED power ON indicator lamp connected across the hot lead and the neutral lead that are applied from said GFIC, and (c) at least one additional a-c power module having means for being rotatably attached in series with said power input and control module, wherein said USB power supply is further comprised of a fourth USB power supply circuit that is applied 120 volts a-c through a fuse (F1) to the primary winding of a step-down transformer (T1) having a secondary winding that is attached across a full-wave rectifier (VR1), wherein the output of the rectifier (VR1) is attached across a filter capacitor (C1) to the output (In) of voltage regulator (U1), wherein the output (out) of the voltage regulator (U1), which is taken across a filter capacitor (C2) produces a regulated d-c voltage ranging from 4 to 6 volts.

\* \* \* \* \*